(12) United States Patent
Kneissler

(10) Patent No.: US 8,190,278 B2
(45) Date of Patent: May 29, 2012

(54) METHOD FOR CONTROL OF A DEVICE

(75) Inventor: Jan Kneissler, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 145 days.

(21) Appl. No.: 11/916,029

(22) PCT Filed: May 24, 2006

(86) PCT No.: PCT/IB2006/051658
§ 371 (c)(1),
(2), (4) Date: Nov. 30, 2007

(87) PCT Pub. No.: WO2006/129249
PCT Pub. Date: Dec. 7, 2006

(65) Prior Publication Data
US 2008/0188959 A1 Aug. 7, 2008

(30) Foreign Application Priority Data
May 31, 2005 (EP) .................... 05104689

(51) Int. Cl.
*G05B 15/00* (2006.01)
*G06F 3/033* (2006.01)
*G09G 5/08* (2006.01)
*G06K 9/00* (2006.01)
*G01S 13/78* (2006.01)
*H01Q 15/00* (2006.01)

(52) U.S. Cl. ............ 700/83; 345/158; 382/105; 342/45; 342/6

(58) Field of Classification Search .................... 700/83; 345/158; 382/105; 342/45, 6
See application file for complete search history.

(56) References Cited

U.S. PATENT DOCUMENTS

| 5,546,843 | A | * | 8/1996 | Degaard ..................... 84/478 |
| 5,583,507 | A | * | 12/1996 | D'Isepo et al. ................. 342/45 |
| 5,627,565 | A | * | 5/1997 | Morishita et al. ............. 345/158 |

(Continued)

FOREIGN PATENT DOCUMENTS
DE 10110979 A1 9/2002
(Continued)

OTHER PUBLICATIONS

Thomas Fuhrmann, et al: The BlueWand as Interface for Ubiquitous and Wearable Computing Environments, Institut fur Telematik, Univ. Karlsruhe (TH) pp. 1-5, Germany. Feb. 2005.

(Continued)

Primary Examiner — Albert Decady
Assistant Examiner — Jason Lin

(57) ABSTRACT

Control of a device including aiming a pointing device comprising a camera and a source of invisible light in the direction of an object associated with the device to be controlled, upon which object a number of retroreflective marker elements are positioned, which reflect at least a part of the invisible light emitted by the light source back to the pointing device; generating a first image of a target area aimed at by the pointing device whereby the light source is inactive; generating a second image of the target area aimed at by the pointing device whereby, invisible light is emitted by the light source in the direction of pointing; processing the target area images to determine the presence of retroreflective marker elements; using information pertaining to the retroreflective marker elements to identify the device to be controlled and/or to determine a control signal for the identified device.

15 Claims, 3 Drawing Sheets

U.S. PATENT DOCUMENTS

| | | | |
|---|---|---|---|
| 5,696,829 A * | 12/1997 | Cordery et al. | 380/55 |
| 5,915,032 A * | 6/1999 | Look | 382/100 |
| 6,160,491 A * | 12/2000 | Kitao et al. | 340/12.28 |
| 6,271,831 B1 * | 8/2001 | Escobosa et al. | 345/158 |
| 6,292,319 B1 * | 9/2001 | Thomas, III | 360/60 |
| 6,384,907 B1 * | 5/2002 | Gooch | 356/139.03 |
| 6,446,865 B1 * | 9/2002 | Holt et al. | 235/382 |
| 6,567,032 B1 | 5/2003 | Mullaly et al. | |
| 7,164,781 B2 * | 1/2007 | Kim et al. | 382/118 |
| 2001/0030668 A1 | 10/2001 | Erten et al. | |
| 2002/0176605 A1 * | 11/2002 | Stafsudd et al. | 382/106 |
| 2003/0007104 A1 * | 1/2003 | Hoshino et al. | 348/734 |
| 2004/0095317 A1 * | 5/2004 | Zhang et al. | 345/158 |
| 2004/0208588 A1 * | 10/2004 | Colmenarez et al. | 398/115 |
| 2004/0211837 A1 * | 10/2004 | Eisenberg et al. | 235/462.41 |
| 2004/0244246 A1 * | 12/2004 | Smith et al. | 40/544 |
| 2004/0252102 A1 | 12/2004 | Wilson et al. | |
| 2006/0250250 A1 * | 11/2006 | Youn | 340/572.7 |
| 2008/0297474 A1 * | 12/2008 | Blomqvist et al. | 345/158 |

FOREIGN PATENT DOCUMENTS

| | | |
|---|---|---|
| EP | 0767443 B1 | 4/2002 |
| FR | 2814026 A1 | 3/2002 |
| JP | 07121293 A | 5/1995 |
| JP | 11305935 A1 | 11/1999 |
| WO | 0135368 A2 | 5/2001 |
| WO | 2004047011 A2 | 6/2004 |

OTHER PUBLICATIONS

Jerry Alan Fails, et al: MagicWand: The True Universal Remote Control, Brigham Young University, Computer Science Dept., Provo UT, USA, pp. 1-2. Feb. 2005.

Colin Swindells, et al: That One There! Pointing to Establish Device Identity, Centre for Systems Science, Simon Fraser University, pp. 1-10, Feb. 2005.

* cited by examiner

METHOD FOR CONTROL OF A DEVICE

This invention relates to a method and system for control of a device, and to a pointing device usable in such a system.

For control of a device, such as any consumer electronics device, e.g. television, DVD player, tuner, etc., a remote control is generally used. However, in the average household, multiple remote controls can be required, often one for each consumer electronics device. Even for a person well acquainted with the consumer electronics devices he owns, it is a challenge to remember what each button on each remote control is actually for. Furthermore, the on-screen menu-driven navigation available for some consumer electronics devices is often less than intuitive, particularly for users that might not possess an in-depth knowledge of the options available for the device. The result is that the user must continually examine the menu presented on the screen to locate the option he is looking for, and then look down at the remote control to search for the appropriate button. Quite often, the buttons are given non-intuitive names or abbreviations. Additionally, a button on the remote control might also perform a further function, which is accessed by first pressing a mode button.

Sometimes, a single remote control device can be used to control a number of devices. Since the remote control is not capable of distinguishing one device from another, the remote control must be equipped with a dedicated button for each device, and the user must explicitly press the appropriate button before interacting with the desired device.

A possible alternative to the usual remote control may be a pointing device. A user interface system based on a pointing device is known from WO 2004/047011 A2 which disclosure is herewith included by reference. The concept of such system is that a pointing device connected to a camera can be used to control any device in its surroundings by pointing at an object, e.g. a casing of the device, a screen, or any other application or accessory associated with the device. The camera of the pointing device generates images of the target area which are subsequently analysed.

The main task that has to be solved by image analysis is to identify the object at which the user is pointing, and to determine the point of intersection of the pointing axis and the object, which point of intersection may be a criteria for generating the control signal for the device. For example, if the user points at a screen displaying a menu comprising a number of options for controlling the associated device, the point of intersection yields the option of the menu at which the user is pointing. In another example the user may point at the "play" button, situated in the casing of a DVD-Player, to start a video film.

However, the problems of identifying the device and/or the correct point of intersection are made more difficult when the objects are similar in shape and appearance, for example, a bank of television or computer monitors of the same size and shape, or consumer electronics devices such as video cassette recorder, DVD player, etc., which often have a similar appearance. Even if the objects can be told apart under normal circumstances, it may no longer be possible to do this under poor visibility conditions, for example in a darkened room.

Therefore, an object of the present invention is to provide an easy and reasonable way which circumvents or reduces the above mentioned problems of automatically identifying an object and/or of determining the point at which the pointing axis intersects with the object.

To this end, the present invention provides a method for control of a device, which method comprises the following steps: A pointing device comprising a camera and a source of invisible light is aimed in the direction of an object associated with the device to be controlled, upon which or in which object a number of retroreflective markers are positioned, which retroreflective marker elements reflect back to the pointing device at least part of the invisible light emitted by the light source. A first image of a target area aimed at by the pointing device is then generated, whereby the light source is inactive, and a second image of the target area aimed at by the pointing device is generated whereby, at least during part of an exposure time for generating the second image, invisible light is emitted by the light source in the direction of pointing. Thereby, it is clear to those skilled in the art, that the second image may in principle also be generated before the first image. The target area images are subsequently processed to determine the presence of retroreflective marker elements, and the information pertaining to the retroreflective marker elements is used to identify the device to be controlled and/or to determine a control signal for the identified device.

An appropriate system for controlling a device using such method requires essentially a pointing device according to the invention comprising a source of invisible light for emitting invisible light in the direction in which the pointing device is aimed, a camera for generating images of a target area in the direction of pointing, which camera is sensitive to the frequency range of the invisible light emitted by the light source, and a synchronisation unit for synchronising the light source and the camera so that a first image of the target area is generated whereby the light source is inactive, and a second image of the target area is generated, whereby, at least during part of an exposure time for generating the second image, invisible light is emitted by the light source in the direction of pointing.

Further, according to the invention, such a system for controlling a device should comprise a number of retroreflective marker elements positioned upon or in an object associated with the device to be controlled, which retroreflective marker elements reflect at least part of the invisible light emitted by the light source back to the pointing device, an image processing unit for processing the target area images to determine the presence of retroreflective marker elements, and a control means for identifying the device to be controlled and/or for determining a control signal for the identified device using information pertaining to the retroreflective marker elements.

A retroreflective element is known as a device that sends light or other radiation back in the direction it came from regardless of the angle of incidence, unlike a mirror, which reflects light back in the direction from whence it came only if the mirror is exactly perpendicular to the light beam. Therefore, an advantage of the retroreflective marker elements is that the light source in the pointing device does not need to produce a particularly intense light beam in order to obtain a reflective signal of sufficient intensity from the marker elements for the camera in the pointing device. Since it may be irritating for the user of the pointing device to be able to see the retroreflective marker elements of all objects, the light source, retroreflective marker elements and camera are therefore configured to operate in a region of the light spectrum invisible to the human eye. Such a region might be, for example, infrared or ultraviolet. The retroreflective marker elements, which can still easily be recognised by means of the camera, can be put to use in the processing of the images and can preferably serve to assist clearly in orientation.

The method and system according to the invention offers easier usage for a corresponding pointing device which is a universal control tool, since one only has to point at a device or object for a control signal to be generated on the basis of the images generated. In particular, by the method herein described, a user can, with such a pointing device, easily identify and interact with a device marked by the retroreflective marker elements—even if any objects associated with different devices are similar or even identical in appearance, or if the surroundings are in darkness. This capability of the pointing device, together with its convenient pointing modality, as described above, combine to make the present invention a powerful and practical tool for myriad situations in everyday life.

The dependent claims and the subsequent description disclose particularly advantageous embodiments and features of the invention.

Various possibilities allow for recognition of the retroreflective marker elements in the second target area image. In a preferred method, the process step for determining the presence of the retroreflective marker elements comprises a step of—preferably pixel-wise—subtraction of the first target area image from the second target area image to generate a target area marker image. This target area marker image then only shows the retroreflective marker elements, so that the retroreflective marker elements can be distinctly recognised in this image.

To reduce the amount of data which must be processed for the identification of the device to be controlled and/or for the determination of the control signal for the identified device, the following two-step-process is preferably used in the method:

In the first step, the image data of the target area images are pre-processed to determine the presence of any retroreflective marker elements. In this step, image data of the first target area image and/or the second target area image and/or the target area marker image are extracted depending on the located retroreflective marker elements. The extracted image data may be, for example, simply the image coordinates of the located retroreflective marker elements or may be certain "regions of interest" surrounding the marker elements or any other data extractable from the images. Such information pertaining to certain recognised elements in the image is, in the sense of the invention, to be regarded as image data. Optionally, the device may also be identified in this step by using the retroreflective marker elements.

In the second step, the extracted image data are further processed, for example to identify the device if this has not done in the first step, and/or for the determination of control signal for the identified device. In particular, in this further process step the point of intersection of the pointing axis with the object at which the user has pointed may be determined and, the control signal, which depends on the object and/or the associated device, may be determined according to this point of intersection.

Preferably, the image data for further processing are extracted by means of a filter rule which is defined according to the device to be controlled. For example, the devices might request special filtering and the pointing device comprises adequate filter means with a memory for storing the filter rules for the various devices. A filter rule for a device might specify, for instance, that all triangular retroreflective marker elements are to be sought in the image data, or that retroreflective marker elements having a minimum size are to be sought. Equally, a filter rule might specify searching for a particular combination of retroreflective marker elements separated by certain distances and having a certain orientation to each other.

Furthermore, the filter rules can also specify which image data are to be selected when certain retroreflective marker elements or combinations of retroreflective marker elements are identified. In this way, a first filter rule for a device might specify that only the coordinates of the located retroreflective marker elements are to be transferred. A filter rule of another device might specify that, in addition to the coordinates of the located retroreflective marker elements, information pertaining to the shape and orientation of the retroreflective marker elements is also to be transferred, so that, for example, the image data of the target marker image containing the identified retroreflective marker elements are also to be transferred. Still other filter rules can specify that certain image regions, for example a 10×10 pixel square region around the centre of a recognised retroreflective marker element, should also be sent. Equally, any other kind of image region surrounding the marker elements can be defined.

The filter rules are preferably specified so that the selection of image data is carried out optimally so that, on the one hand, the smallest possible amount of data is selected for processing and, on the other hand, a sufficient amount of data is selected to ensure that the control signal can be determined relatively quickly. Thus, it may suffice for a device if only the position information pertaining to the retroreflective marker elements are transferred and, if desired, information describing, for example, their shape and size. Should these retroreflective marker elements be, for instance, located on the front of a device housing on which certain buttons are positioned at certain points, the coordinates of the retroreflective marker element are sufficient to determine the point of intersection of the pointing axis with the front of the device housing, and to determine at which button the user is currently aiming the pointing device. In another example, for instance a screen showing a number of frequently changing menu items, it might be advantageous to select a larger amount of data. It may be advantageous in such a case to select all the image data of the first or second target area images that comprise at least a section of the screen between the identified retroreflective marker elements. On the basis of these image data, it might be made easier to identify the point of intersection or the selected menu option.

In a particularly preferred embodiment of the invention, the pre-processing of the target area images or target area marker image is carried out within the pointing device itself. In other words, the retroreflective marker elements and, optionally, the object or device which is being pointed at are identified within the pointing device.

However, the computing power of such a pointing device, which is preferably realized to be held comfortably in the hand, is of necessity quite limited by the power required by complicated computing processes. Therefore, the extracted image data are preferably transmitted for further processing to a control unit associated with the device to be controlled. This control unit determines a control signal for the device to be controlled. This control unit may be, for example, part of the device and be incorporated in the same casing as the device itself. In another embodiment, this control unit may be realised as a separate entity which can communicate in any appropriate manner with the device to be controlled, whereby such a control unit may be capable of controlling more than one device.

In a preferred embodiment, the pointing device transmits the image data extracted according to a specific filter rule together with an information signal (referred to as "filter identifier" in the following) for identifying the associated filter rule and/or the device associated with this filter rule. This allows the pointing device to transmit the image data with the associated information signal in broadcast manner. In particular, when the various devices are assigned to different control units, each of which is only associated with its own device, the advantage of this method is that the pointing device does not have to identify the device to be controlled, but must only identify the stored filter rule and its associated filter identifier. Each device control unit can filter the relevant data out of the broadcast signal on the basis of the filter identifier, and need therefore process only relevant image data intended for that control unit.

This method therefore ensures in an advantageous manner that, on the one hand, the image processing in the pointing device is considerably limited, and that, on the other hand, the data transfer between the pointing device and the control units can be greatly reduced. The method is therefore also applicable to limited communication bandwidths, such as are currently available to short-range radio channels such as Bluetooth or similar. Furthermore, the quite limited processing capabilities available in the current consumer electronic devices and pointing devices are taken into consideration.

Insofar as retroreflective marker elements matching multiple filter rules are identified, it is not necessary to send the image data extracted according to the filter rules more than once. It suffices, owing to the method of broadcast transmission, that enough image regions are extracted during preprocessing in the pointing device to satisfy the requirements of the various filter rules and that these image regions are then transmitted along with the information pertaining to the applied filter rules or the corresponding devices, e.g. the filter identifiers. In this case, the devices or their associated control units receive more data than they may actually require. However, the total amount of transferred data can be kept to a minimum in this way.

In particular, in a preferred method, the entire first or second target area images and optionally the target area marker images or image data of the retroreflective marker elements, e.g. the coordinates of the retroreflective marker elements, are transmitted to the control units, should the quantity of the image data extracted by means of the filter rules requested by the different devices exceed a certain level. For example, this makes sense when the quantity of image data of the entire first target area image is lower than the entire amount of image data extracted according to the filter rules. In this case also, in addition to transmission of the entire target area images, the filter identifier of all relevant filters are transmitted so that the corresponding control units know that the transmitted image is intended for them, and that they must perform further processing in an appropriate manner.

The retroreflective marker elements can be any type of element with which a retroreflective effect, as described above, can be obtained. The retroreflective effect can usually be obtained in different ways:

a) A retroreflective element comprises a set of three perpendicular mirrors which form a corner (a corner reflector or corner cube), and a transparent sphere of material with a refractive index of 2.

b) A retroreflective element may consist of many very small versions of these structures incorporated in a thin sheet or in paint. In the case of paint containing glass beads, the paint causes the beads to adhere to the surface where retroreflection is required, and the beads protrude from the paint, their diameter being about twice the thickness of the coating of paint.

It is therefore possible, for example, to apply a suitable coating to the surfaces of individual objects—for instance the housing of a device to be controlled—so that the retroreflective marker elements form an integral part of the object or housing of the device.

Another alternative might be to use retroreflective marker elements in the form of stickers that are simply applied to the surface of the object or device. Such self-adhesive retroreflective foils, usually featuring embedded glass microbeads, are available in various colours, such as those manufactured by the firm Orafol Klebetechnik GmbH. Furthermore, a range of colours are available with which the retroreflective foils can be printed.

Preferably, retroreflective marker elements are used which, in the visible range of light, appear transparent or identical to the surface of the object to which or in which they are applied, so that they do not alter the outward appearance of the object and so that a user will not be aware of the retroreflective marker elements at first glance.

The retroreflective marker elements are preferably designed, i.e. shaped and coloured, and arranged in a particular manner to give a unique identifier associated indirectly with the object of the device to be controlled or directly with the device to be controlled.

When stickers are to be used, the user himself can apply these to the devices or associated objects which he wishes to use for control with the aid of the pointing device. To this end, the user can, upon purchase of a pointing device or a certain device to be controlled, be given a set of retroreflective marker elements to be applied appropriately. It is not necessary for the user to apply the retroreflective marker elements in a fixed, predefined way or to precisely measure out exact locations. All required information for further processing with the retroreflective marker elements can be obtained in a setup or initialisation procedure wherein the user is asked to aim the pointing device at the object for a few seconds after attaching the stickers to the object. Using such a training mode, the user can specify, via a suitable user interface, the device which is to be associated with the currently identifiable retroreflective markers, whereby the corresponding device or control unit can then independently determine the filter rule which is to be used with the device.

If a user purchases a new device which he wishes to be able to control with a pointing device in his existing system, the device can, supposing that it features suitable retroreflective marker elements, immediately transmit a filter rule to the pointing device in an initialisation procedure so that, in future, this filter rule will be taken into consideration by the pointing device and data extracted according to this filter rule will be transmitted to the device or the corresponding control unit.

The invention makes possible the use of the following advantageous techniques:

For example, a type of visual feedback can be provided whenever a device or object which is being pointed at is identified as being relevant. In particular, when the source of light is emitting ultraviolet light, a suitable fluorescent layer or coating might briefly be made visible, for example in the form of a button surround on the front panel of the device which button surround reflects visible light.

If the source of invisible light is a source of infrared light, it is possible, in a preferred embodiment of the invention, to control—with the aid of the pointing device—such classical devices which cannot be controlled by simply pointing at an associated object in the manner already described. In such a case, the infrared source of light can be used to directly send a suitable code to the device, such as is the case for infrared remote controls commonly available at the present time. To this end, the device can, for example, be first identified by the above-mentioned method. Subsequently, a suitable control signal can be generated for the device in a dedicated control unit and transmitted in a suitable form to the pointing device. This control signal can finally be transmitted from the pointing device in the form of an infrared signal to the device to be controlled. It is of course necessary that the control unit obtains, in an initialisation procedure, the necessary information for a later identification of the devices to be controlled and for generation of the appropriate control signals. It is also basically possible for the pointing device itself to feature a suitable control unit for controlling such devices.

Furthermore, it is possible in a preferred embodiment to zoom into or out of regions of interest, i.e. to use a larger or smaller area of the camera sensor depending on the distance between it and the object. The problem of identifying an object which is so close to the pointing device that it does not fit into an image, is thereby solved. Equally, the resolution can be varied according to the distance to the object.

To determine, for example, the point of intersection between the axis of pointing and the object, computer vision algorithms can be applied.

A method of processing the extracted image data of the target area image of the object using computer vision algorithms might comprise detecting distinctive points in the target image data, determining corresponding points in a template of the object of the device, and developing a transformation for mapping the points in the image data to the corresponding points in the template. The distinctive points of the image data might be the retroreflective marker elements but might equally (additionally) be distinctive points of the object itself or points in the area surrounding the device. This transformation can then be used to determine the position and aspect of the pointing device relative to the object so that the point of intersection of the pointing axis with the object can be located in the template. The position of this intersection in the template corresponds to the target point on the object associated with the device to be controlled and can be used to easily determine which option has been targeted by the user. In this way, comparing the image data with the pre-defined template may be restricted to identifying and comparing only salient points such as distinctive corner points. The term "comparing", as applicable in this invention, is to be understood in a broad sense, i.e. by only comparing sufficient features in order to quickly identify the option at which the user is aiming.

For ease of use, the pointing device can be in the shape of a wand or pen in an elongated form that can be grasped comfortably and easily carried around by the user. The user can thus direct the pointing device at a device to be controlled while positioned at a distance from that device. Equally, the pointing device might be shaped in the form of a pistol. Furthermore, an additional visible light source might be mounted in or on the pointing device, serving to illuminate the area at which the pointing device is aimed, so that the user can easily locate a device to be controlled, even if the surroundings are in darkness. Equally, a laser light source producing a beam of visible laser light might be incorporated in or on the pointing device to show the user exactly where he is aiming the pointing device.

The pointing device and control units described in the above combine to give a powerful control system, for use in practically any kind of environment, such as a home, office, museum, hospital or hotel environment. The method according to the invention can be applied to any electrically or electronically controllable device. Furthermore, the control unit and the device to be controlled can comprise any number of modules, components or units, and can be distributed in any manner.

Other objects and features of the present invention will become apparent from the following detailed descriptions considered in conjunction with the accompanying drawing. It is to be understood, however, that the drawings are designed solely for the purposes of illustration and not as a definition of the limits of the invention.

Figure 1:
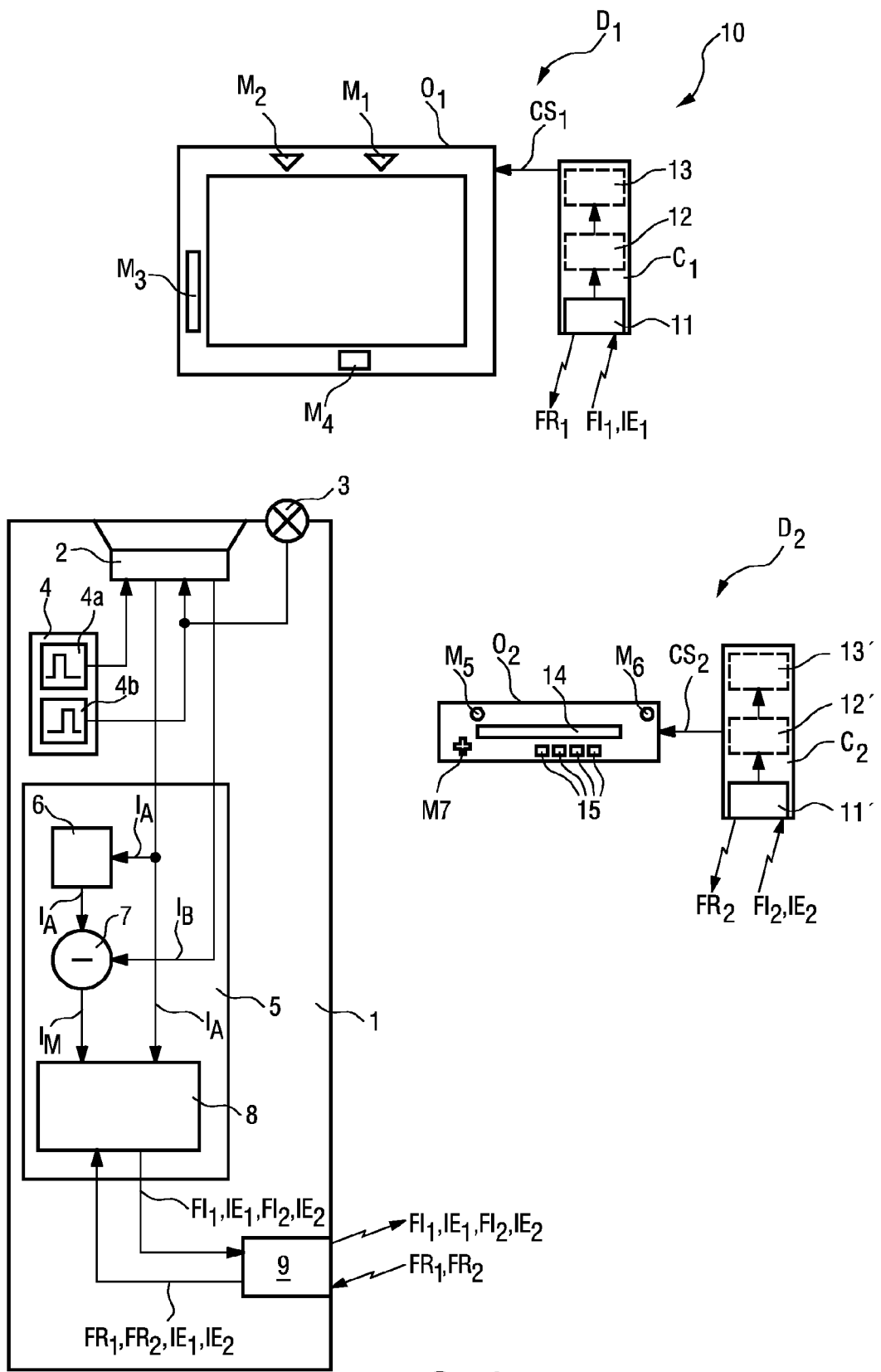
FIG. 1 is a schematic diagram of a system for controlling a device, showing a pointing device and two devices in accordance with an embodiment of the present invention.

The system shown in FIG. 1 comprises two devices $D_1$, $D_2$ to be controlled and a pointing device 1 with which the devices $D_1$, $D_2$ can be controlled. In this example, the objects $O_1$, $O_2$, associated with the corresponding devices $D_1$, $D_2$ and which can be identified with the aid of a camera 2 in the pointing device 1, are the casings or housings of the actual devices $D_1$, $D_2$. Although only two devices are shown in this example, any number of devices can be controlled with the aid of the pointing device 1, when such additional devices are configured for use in the method according to the invention.

The first device $D_1$ is a television with a screen. The second device is, for example, a tuner of a stereo sound system with a display 14 and various buttons 15 on its front panel. For the purposes of illustration, the pointing device 1 is shown on a larger scale as the devices $D_1$, $D_2$ to be controlled. The pointing device 1, being held in the hand, would generally be much smaller than the devices $D_1$, $D_2$ to be controlled.

Each of these devices $D_1$, $D_2$ is equipped with its own control unit $C_1$, $C_2$, shown here for the sake of clarity as separate entities beside their corresponding objects $O_1$, $O_2$. Preferably, each of these control units $C_1$, $C_2$ would be incorporated in the housing of the corresponding device $D_1$, $D_2$.

However, it is basically possible to equip a device $D_1$, $D_2$ as shown with an external control unit. For example, a device can be upgraded to work with such a control unit as long as it has a suitable control input by means of which the control module $C_1$, $C_2$ can send a control signal $CS_1$, $CS_2$ to the associated device $D_1$, $D_2$. For example, a system might be composed by taking a classical device, such as is usually controlled by means of an infrared remote control, and allowing this to be served by a control unit equipped with an appropriate infrared transmitter as long as the device is able to receive the infrared signal sent from the control unit. In this way, any device can be upgraded with the aid of an external control unit so that it can be controlled using the method according to the invention.

According to the invention, retroreflective marker elements $M_1$, $M_2$, $M_3$, $M_4$, $M_5$, $M_6$, $M_7$ are applied to the housings of the objects $O_1$, $O_2$ of the corresponding devices $D_1$, $D_2$. These can be, for example, stickers which are transparent or have the same colour as the surface of the housing $O_1$, $O_2$ to which they are applied, so that they are not noticed. Alternatively, these retroreflective marker elements $M_1$, $M_2$, $M_3$, $M_4$, $M_5$, $M_6$, $M_7$ might be directly integrated in the surface of the housing $O_1$, $O_2$, for instance in the paint itself. In the above example, the retroreflective marker elements $M_1$, $M_2$, $M_3$, $M_4$, $M_5$, $M_6$, $M_7$ have different shapes. Here, two of the retroreflective marker elements $M_1$, $M_2$ attached to the television $D_1$ have a triangular shape. A further retroreflective marker element $M_3$ features a longitudinal shape with rounded corners, and a fourth retroreflective marker element $M_4$ is in the shape of a rectangle. In the case of the second device $D_2$, two round retroreflective marker elements $M_5$, $M_6$ and a further retroreflective marker element $M_7$ in the shape of a cross are used. The shapes of the retroreflective marker elements $M_1$, $M_2$, $M_3$, $M_4$, $M_5$, $M_6$, $M_7$ together with their relative positions yield a unique identifier associated with the device $D_1$, $D_2$ to be controlled. Use of retroreflective marker elements without a rotational axis of symmetry, or use of a combination of retroreflective marker elements, has the advantage that the retroreflective marker elements thus clearly describe their orientation, and no uncertainty as to orientation will have to be dealt with in a later recognition step.

The pointing device 1 comprises the following components necessary for the invention—a camera 2, a source of invisible light 3, a synchronisation unit 4, a processing unit 5 comprising a frame buffer 6, a subtraction unit 7 and a digital signal processor (DSP) 8. Furthermore, the pointing device 1 comprises a wireless communication module 9 with which data can be transmitted to and received from the control units $C_1$, $C_2$ of the devices $D_1$, $D_2$.

It goes without saying that the pointing device 1 can comprise other components besides those mentioned above, for example buttons, or a type of user interface by means of which a user can input additional commands for the generation of a control signal for a device. In regard to such additional components, reference is made once more to WO 2004/047011A2, in which a number of additional components for such a pointing device are described in detail. The pointing device can also be used for the generation of control signals in the manner described therein. For example, besides simply pointing at a target, the pointing device can be moved in a particular manner or gesture which can be interpreted in a particular manner for the generation of control signals.

The functions of the individual components of the pointing device 1 and the control units $C_1$, $C_2$ shown in FIG. 1 are described in detail in the following.

Two timers 4a, 4b of the synchronisation unit 4 are used to control the camera 2 and the light source 3 in such a way that a first target area image $I_A$ is generated of a target area A in the direction of pointing. This first target area image $I_A$ is stored in a frame buffer 6 and also forwarded to a DSP 8. After a short delay, which should be so short that any motion of the pointing device relative to the target area is negligible in that time, a second target area image $I_B$ is generated. During generation of the second target area image $I_B$ the light source 3 is active, at least briefly. The invisible light emitted by the light source 3 is reflected back from the retroreflective marker elements $M_1$, $M_2$, $M_3$, $M_4$ of the object $O_1$, in this case the housing $O_1$ of the television, in the direction of the pointing device 1 and thereby in the direction of the camera 2. The second target area image $I_B$ is forwarded to a subtraction unit 7, in which the first target area image $I_A$, stored in the frame buffer 6, is subtracted pixel-wise from the second target area image $I_B$, yielding a target area marker image $I_M$. In this target area marker image $I_M$ the individual retroreflective markers $M_1$, $M_2$, $M_3$, $M_4$ can clearly be identified. This image, as well as the first target area image $I_A$, is processed by a DSP 8.

Firstly, the coordinates of each recognised retroreflective marker element $M_1$, $M_2$, $M_3$, $M_4$ are determined. This may be done using various known image processing methods. One possibility is to make use of a so-called "Harris corner detector". This is a method which can be used to identify the corners of the retroreflective marker elements. Once the corners and edges of the retroreflective marker elements have been identified using the various image processing techniques, the centre points of the retroreflective marker elements, for instance, can be determined relative to a coordinate system for the image. These coordinates can then serve as image data for further processing, for example for identification of an object $O_1$, at which the user is aiming.

Certain filter rules $FR_1$, $FR_2$ are then applied in order to determine whether retroreflective marker element of potential interest for certain devices have been detected in the image. To this end, each of the devices $D_1$, $D_2$, can send suitable device specific filter rules $FR_1$, $FR_2$, for example via transmitter interfaces 11, 11', to the wireless communication module 9 of the pointing device 1. These are preferably accompanied by appropriate filter identifiers $IE_1$, $IE_2$, one for each corresponding filter rule $FR_1$, $FR_2$. The DSP 8 can then, with the aid of the filter rules $FR_1$, $FR_2$, filter out all data of interest from the target area image $I_A$.

For example, a filter rule $FR_1$ of the first device $D_1$ might specify that the DSP 8 search in all images for triangular and rectangular retroreflective marker elements $M_1$, $M_2$, $M_3$, $M_4$ in a particular constellation. Another filter rule $FR_2$, associated with the second device $D_2$, might specify searching for round retroreflective marker elements $M_5$, $M_6$ and a cross-shaped retroreflective marker element $M_7$.

Once the relevant retroreflective marker elements $M_1$, $M_2$, $M_3$, $M_4$, $M_5$, $M_6$, $M_7$ matching the filter rules $FR_1$, $FR_2$ have been found by the image processing of the DSP 8, image data $IE_1$, $IE_2$ are selected according to the filter rules $FR_1$, $FR_2$. The selected image data $IE_1$, $IE_2$ might simply comprise the coordinates of the identified retroreflective marker elements $M_1$, $M_2$, $M_3$, $M_4$, $M_5$, $M_6$, $M_7$ and/or coordinates of certain significant points such as corners or edges in the vicinity of these retroreflective marker elements $M_1$, $M_2$, $M_3$, $M_4$, $M_5$, $M_6$, $M_7$. Optionally, a type of confidence measure, such as a signal-strength measure, can also be supplied, indicating the accuracy of the identification. The orientation of the identified structure can also be supplied. Furthermore, pixels within a certain region (region of interest) surrounding the identified retroreflective markers $M_1$, $M_2$, $M_3$, $M_4$, $M_5$, $M_6$, $M_7$ can also be supplied.

In the following, a few example commands are given, with which the image data for transmission, also called "spot shapes", can be specified in a filter rule with suitable command definition:

"none": only the coordinates, without any further information, are transmitted.

"one pixel": only colour information pertaining to the centre pixel of the identified retroreflective marker is transmitted (for the case when retroreflective markers are used having different colours in the invisible light range).

"rectangular": this command indicates that two integers are to be supplied which define the size in pixels of the rectangular image extract that is to be transmitted, the centre of which rectangular image is the centre point of the coordinates of the identified retroreflective marker element.

"circular": with this command, the radius in the form of a integer is to be given, so that all pixels about the centre point of the coordinates of the retroreflective marker element and lying within this radius from the centre point, are to be sent as an image extract to the device corresponding to this filter rule.

Figure 2A:
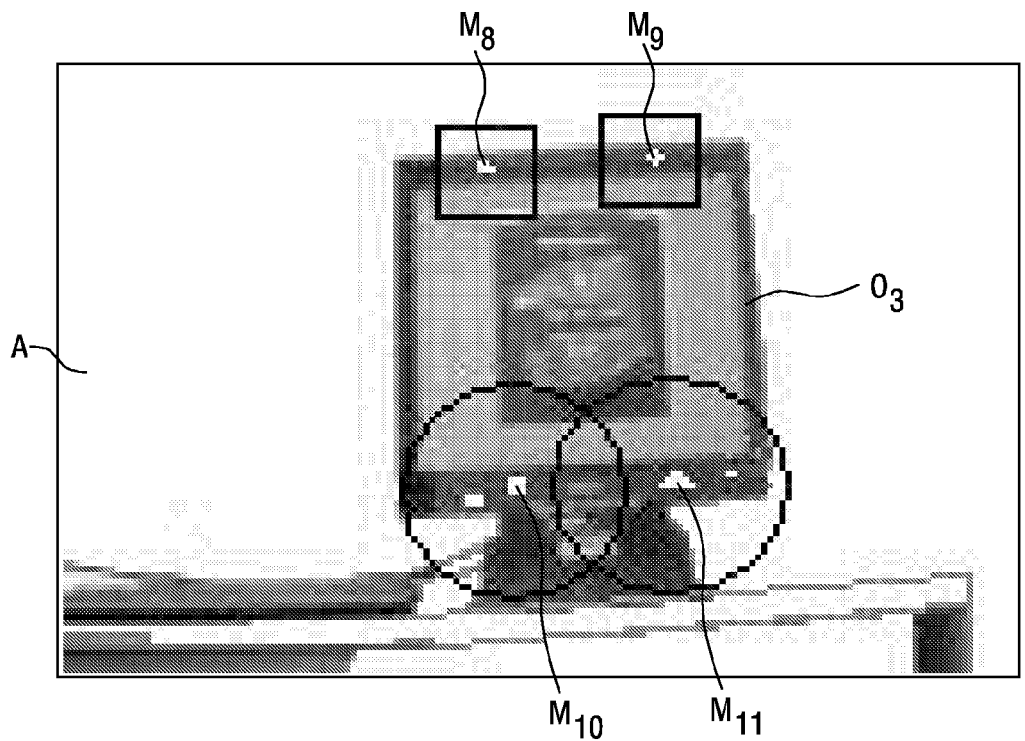
FIG. 2a is a target area image of a monitor of a device, on which monitor four retroreflective marker elements are positioned.
Figure 2B:
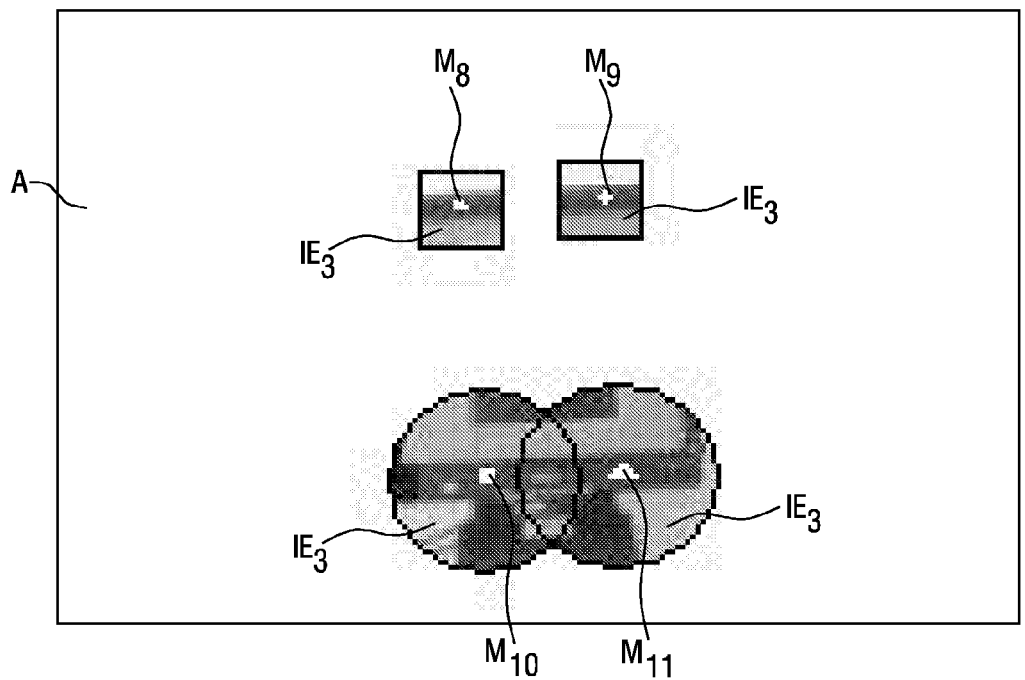
FIG. 2b shows the image data extracted from the target area image of FIG. 2a according to a filter rule associated with the device of the monitor.

An example of such selected image extracts is given in FIGS. 2a and 2b. FIG. 2a shows a computer monitor $D_3$. This monitor is the object $O_3$ associated with a computer (not shown in the diagram), which is to be remotely controlled with the aid of the pointing device. A triangular marker $M_8$ and a cross-shaped marker $M_9$ have been applied to the top edge of the monitor $O_3$, whilst a rectangular marker $M_{10}$ and a further triangular marker $M_{11}$ have been applied to the lower edge. Certain image areas $IE_3$ surrounding the markers $M_8$, $M_9$, $M_{10}$, $M_{11}$ have been extracted for the pointing device 1 on the basis of predefined filter rules for these markers $M_8$, $M_9$, $M_{10}$, $M_{11}$, specified by the computer to be controlled. These image areas $IE_3$ are shown again in FIG. 2b.

Only the extracted image areas $IE_1$, $IE_2$ are transmitted, as shown in FIG. 1, via the wireless communication interface 9 to the control units $C_1$, $C_2$ of the devices $D_1$, $D_2$. In order for a device $D_1$, $D_2$ to recognise that the image data $IE_1$, $IE_2$ are intended for that device, the image data $IE_1$, $IE_2$ are accompanied by the corresponding identifier $F_{11}$, $F_{12}$, with which the pointing device 1 has been provided by the devices $D_1$, $D_2$ (or control units $C_1$, $C_2$ of the devices $D_1$, $D_2$) in a prior initialisation procedure.

To process the image data within the control unit $C_1$, $C_2$ of the device $D_1$, $D_2$, reference is made once again to FIG. 1. The control unit $C_1$, $C_2$ comprises, as mentioned above, a suitable wireless communication module 11, 11', with which the data can be transmitted and received.

The identification is carried out in an identifier unit 12, 12' to decide whether the image data are intended for that device $D_1$, $D_2$. The direction of pointing and therefore the point of intersection of the pointing direction and the object $O_1$, $O_2$ of the corresponding device $D_1$, $D_2$ can also take place in this identifier unit 12, 12'.

The data are subsequently forwarded to a device control signal generation unit 13, 13', which then uses the data to generate the actual control signal $CS_1$, $CS_2$. If the user issues additional commands by means of a user interface on the pointing device 1, such as suitable buttons, or by gestures made with the pointing device 1, these commands are also forwarded together with the image data $IE_1$, $IE_2$ and the filter identifier $F_{11}$, $F_{12}$, and are also processed accordingly in the device control signal generation unit 13, 13'. The control signal $CS_1$, $CS_2$ generated in this manner is then transmitted to the relevant components of the device $D_1$, $D_2$.

If various filter rules are used to request different types of information and different image shapes for a particular retroreflective marker element, all image data are preferably combined, as far as possible, in a single transmission. For example, the coordinates of the retroreflective marker element need only be supplied once. In the same way, image data such as certain pixel values should not be multiply sent, in order to keep the quantity of data as low as possible. The filter identifiers of all of the applied filter rules are transmitted along with the image data, so that the relevant devices can process the received data accordingly.

Figure 3:
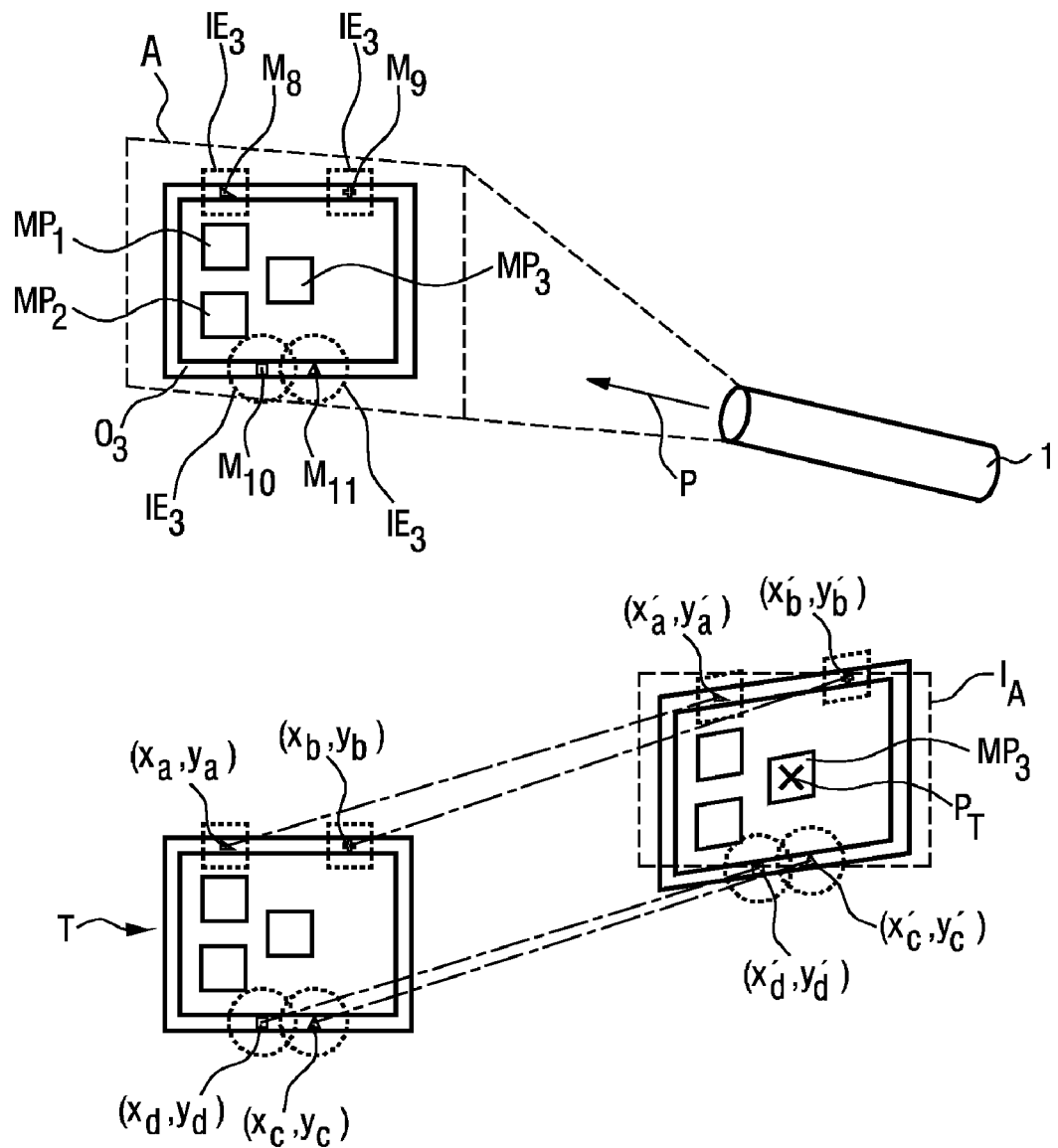
FIG. 3 is a schematic diagram showing an object, its associated template, and a target area image generated by a pointing device in accordance with an embodiment of the present invention In the drawings, like numbers refer to like objects throughout. The pointing device described is held and operated by a user, not shown in the drawings.

The following explains once more how a device can be controlled with the aid of a pointing device, within the scope of a method according to the invention. The user will not always aim the pointing device at a object or device from directly in front—it is more likely that the pointing device 1 will be aimed at a more or less oblique angle to the object, since it is often more convenient to aim the pointing device 1 than it is to change one's own position. This is illustrated in FIG. 3, which shows a schematic representation of a target area image $I_A$ generated by a pointing device 1, aimed at the object $O_3$, in this case the monitor of FIG. 2a, from a distance and at an oblique angle, so that the scale and perspective of the object $O_3$ in the target area A appear distorted in the target area image $I_A$. A number of options $MP_1$, $MP_2$, $MP_3$ can be seen on the display of the monitor $O_3$. The retroreflective marker elements $M_8$, $M_9$, $M_{10}$, $M_{11}$ located on this monitor $O_3$ and the image data (here regions of interest) specified by the filter rule associated with the device to be controlled are also shown in this figure. The user, not shown in the diagram, may wish to select one of these options $MP_1$, $MP_2$, $MP_3$ with the aid of the pointing device 1.

As previously described under FIG. 2b, it is sufficient to transmit only the coordinates of the centre points of the individual retroreflective marker elements $M_8$, $M_9$, $M_{10}$, $M_{11}$ and the marked areas $IE_3$ around the centre points of the retroreflective marker elements $M_8$, $M_9$, $M_{10}$, $M_{11}$. In FIG. 3, the entire target area image $I_A$ is shown for the sake of clarity. The extracts $IE_3$ of the target area image $I_A$, sent from the pointing device to the control unit and used for later processing, are indicated by the dotted lines. These data are transmitted by the pointing device together with an identifier for the filter rule. The control unit of the device (not shown in the diagram) associated with the monitor $O_3$ can interpret the identifier to see that the data are intended for this device, and can then proceed to interpret the user actions in order to control the device accordingly.

To this end, the extracted image data $IE_3$ of the target area image $I_A$ are examined in more detail. Regardless of the angle of the pointing device 1 with respect to the device $D_1$, the target area image $I_A$ is always centred around a target point $P_T$. An image processing unit of the control unit compares the extracted image data $IE_3$ of the target area image $I_A$ with pre-defined templates T to determine the option $MP_3$ being pointed at by the user. To this end, the point of intersection $P_T$ of the longitudinal axis of the pointing device 1 (the pointing axis) with the device $D_1$ is located in the target area image $I_A$, using the coordinates sent along with the extracted image data. The point in the template T corresponding to the point of intersection $P_T$ can then be located.

Therefore, the coordinates $[(x_a', y_a'), (x_b', y_b'), (x_c', y_c'), (x_d', y_d')]$ of the centre points of the retroreflective marker elements can be compared with corresponding points $[(x_a, y_a), (x_b, y_b), (x_c, y_c), (x_d, y_d)]$ in the template T. Additionally, computer vision algorithms using edge- and corner detection methods may be applied to locate further points in the image data $IE_3$ of the target area image $I_A$ which correspond to points in the template T of the device to achieve a higher precision.

Each point can be expressed as a vector e.g. the point $(x_a, y_a)$ can be expressed as $\vec{v}_a$. As a next step, a transformation function $T_\square$ is developed to map the target area image $I_A$ to the template T:

$$f(\lambda) = \sum_i |T_\lambda(\vec{v}_i) - \vec{v}_i'|^2$$

where the vector $\vec{v}_i$ represents the coordinate pair $(x_i, y_i)$ in the template T, and the vector $\vec{v}_i'$ represents the corresponding coordinate pair $(x_i', y_i')$ in the target area image $I_A$. The parameter set $\square$, comprising parameters for rotation and translation of the image yielding the most cost-effective solution to the function, can be applied to determine the position and orientation of the pointing device 1 with respect to the object $O_3$. The computer vision algorithms make use of the fact that the camera 2 within the pointing device 1 is fixed and "looking" in the direction of the pointing gesture. The next step is to calculate the point of intersection $P_T$ of the longitudinal axis of the pointing device 1, in the direction of pointing P, with the object $O_3$. This point may be taken to be the centre of the target area image $I_A$. Once the coordinates of the point of intersection have been calculated, it is a simple matter to locate this point in the template T. In this way, the system can determine the option $MP_3$ at which the user is aiming, and can generate the appropriate control signal for the device associated with the object $O_3$.

Although the present invention has been disclosed in the form of preferred embodiments and variations thereon, it will be understood that numerous additional modifications and variations could be made thereto without departing from the scope of the invention. The pointing device can serve as the universal user interface device in the home or any other environment with electrically or electronically controllable devices. In short, it can be beneficial wherever the user can express an intention by pointing. Its small form factor and its convenient and intuitive pointing modality can elevate such a simple pointing device to a powerful universal remote control. As an alternative to the pen shape, the pointing device could for example also be a personal digital assistant (PDA) with a built-in camera, or a mobile phone with a built-in camera.

For the sake of clarity, it is also to be understood that the use of "a" or "an" throughout this application does not exclude a plurality, and "comprising" does not exclude other steps or elements. A "unit" may comprise a number of blocks or devices, unless explicitly described as a single entity.

The invention claimed is:

1. A method of controlling a device, the method comprising acts of:
arranging a plurality of retro-reflective marker elements having a plurality of shapes in unique positions relative to each other in a target area of an object to uniquely identify a device associated with the object;
aiming a pointing device comprising a camera and a source of invisible light in the direction of at least one target area on an object associated with the device to be controlled, the plurality of retro-reflective marker elements reflecting at least a part of the invisible light emitted by the light source back to the pointing device;
generating a first image of a target area aimed at by the pointing device when the light source is inactive;
generating a second image of the target area aimed at by the pointing device whereby, at least during part of an exposure time for generating the second image, invisible light is emitted by the light source in the direction of pointing;
extracting image data from at least one of the first target area image and the second target area image;
processing the extracted image data to determine the presence of the retro-reflective marker elements;
using information pertaining to the retro-reflective marker elements to identify the device to be controlled and/or to determine a control signal for the identified device, the extracted image data is extracted by means of a filter rule which is defined according to the device to be controlled.

2. The method according to claim 1, wherein the act of determining the presence of the retro-reflective marker elements comprises an act of subtracting the first target area image from the second target area image to generate a target area marker image.

3. The method according to claim 2, further comprising an act of:
extracting image data from the target area marker image depending on the located retro-reflective marker elements.

4. A method of controlling a device, the method comprising acts of:
arranging a plurality of retro-reflective marker elements having a plurality of shapes in unique positions relative to each other in a target area of an object to uniquely identify a device associated with the object;
aiming a pointing device comprising a camera and a source of invisible light in the direction of at least one target area on an object associated with the device to be controlled, the plurality of retro-reflective marker elements reflecting at least a part of the invisible light emitted by the light source back to the pointing device;
generating a first image of a target area aimed at by the pointing device when the light source is inactive;
generating a second image of the target area aimed at by the pointing device whereby, at least during part of an exposure time for generating the second image, invisible light is emitted by the light source in the direction of pointing;
processing the target area images to determine the presence of the retro-reflective marker elements;
using information pertaining to the retro-reflective marker elements to identify the device to be controlled and/or to determine a control signal for the identified device
wherein the act of determining the presence of the retro-reflective marker elements comprises an act of subtracting the first target area image from the second target area image to generate a target area marker image and when the presence of the retro-reflective marker elements is determined, extracting image data selected from at least one of the first target area image, the second target area image, and the target area marker image depending on the located retro-reflective marker elements, and processing the extracted image data for the identification of the device to be controlled and/or for determination of the control signal for the identified device, the extracted image data is extracted by means of a filter rule which is defined according to the device to be controlled.

5. The method according to claim 3, wherein the extracted image data is transmitted for further processing to a control unit associated with the device to be controlled.

6. A method of controlling a device, the method comprising acts of:
arranging a plurality of retro-reflective marker elements having a plurality of shapes in unique positions relative to each other in a target area of an object to uniquely identify a device associated with the object;
aiming a pointing device comprising a camera and a source of invisible light in the direction of at least one target area on an object associated with the device to be controlled, the plurality of retro-reflective marker elements reflecting at least a part of the invisible light emitted by the light source back to the pointing device;
generating a first image of a target area aimed at by the pointing device when the light source is inactive;
generating a second image of the target area aimed at by the pointing device whereby, at least during part of an exposure time for generating the second image, invisible light is emitted by the light source in the direction of pointing;
processing the target area images to determine the presence of the retro-reflective marker elements;
using information pertaining to the retro-reflective marker elements to identify the device to be controlled and/or to determine a control signal for the identified device,
wherein the act of determining the presence of the retro-reflective marker elements comprises an act of subtracting the first target area image from the second target area image to generate a target area marker image and when the presence of the retro-reflective marker elements is determined, extracting image data selected from at least one of the first target area image, the second target area image, and the target area marker image depending on the located retro-reflective marker elements, and processing the extracted image data for the identification of the device to be controlled and/or for determination of the control signal for the identified device, the extracted image data is transmitted for further processing to a control unit associated with the device to be controlled; and the pointing device transmitting the extracted image data, extracted according to a specific filter rule, together with an information signal for identifying the associated filter rule and/or the device associated with this filter rule.

7. The method according to claim 6, wherein the entire first target area image or the entire second target area image is transmitted to the control unit(s) if the quantity of the image data extracted by means of the filter rules exceeds a predefined level.

8. The method according to claim 1, wherein the design of the retro-reflective marker elements is selected from at least one of shaped and color and the arrangement is provided in a particular manner to give a unique identifier.

9. The method according to claim 1, wherein the retro-reflective marker elements appear transparent in a visible frequency range, or appear in the visible frequency range to be identical to the surface of the object upon which or in which they are positioned.

10. The method according to claim 1, wherein the retro-reflective marker elements are stickers.

11. A system for controlling a device, the system comprising: a pointing device comprising:
   a source of invisible light for emitting invisible light in the direction of at least one target area at which the pointing device is aimed,
   a camera for generating images of the target area, wherein the camera is sensitive to the frequency range of the invisible light emitted by the light source,
   a synchronization unit for synchronizing the light source and the camera so that a first image of the target area is generated when the light source is inactive, and a second image of the target area is generated, when, at least during part of an exposure time for generating the second image, invisible light is emitted by the light source in the direction of pointing;
   one or more retro-reflective marker elements having a plurality of shapes are arranged in unique positions relative to each other in the target area of an object to uniquely identify a device separated from and associated with the object;
   an image processing unit for processing the target area images to determine the presence of the one or more retro-reflective marker elements on the object separated from and associated with the device to be controlled, the one or more retro-reflective marker elements reflect at least part of the invisible light emitted by the light source back to the pointing device; and
   control means for extracting image data from at least one of the processed target area images, identifying the device to be controlled and/or for determining a control signal for the identified device, the extracted image data is extracted by means of a filter rule which is defined according to the device to be controlled.

12. A pointing device comprising:
   a camera;
   a source of invisible light enabled to be pointed in the direction of an object associated with a device to be controlled; and
   a plurality of retro-reflective marker elements having a plurality of shapes are arranged on the object in unique positions relative to each other in a target area of an object to uniquely identify the device separated from and associated with the object, the retro-reflective marker elements can reflect at least part of the invisible light emitted by the light source back to the pointing device, wherein the camera is enabled to generate
      a first image of a target area aimed at by the pointing device when the light source is inactive, and
      a second image of the target area aimed at by the pointing device when, at least during part of an exposure time for generating the second image, invisible light is emitted by the light source in the direction of pointing, and
      extract image data from at least one of the first and second images, the extracted image data is extracted by means of a filter rule which is defined according to the device to be controlled.

13. The pointing device of claim 12, further comprising means for processing the target area images to determine the presence of the retro-reflective marker elements and using information pertaining to the retro-reflective marker elements to identify the device to be controlled and to determine a control signal for the identified device.

14. The pointing device of claim 12, further comprising a processor configured to process the target area images to determine the presence of the retro-reflective marker elements and configured to use information pertaining to the retro-reflective marker elements to identify the device to be controlled and to determine a control signal for the identified device.

15. A system for controlling a device, the system comprising: a pointing unit comprising:
   a source configured to emit invisible light in a direction of at least one target area of an object associated with the device at which the pointing unit is aimed;
   one or more retro-reflective marker elements having a plurality of shapes are arranged in unique positions relative to each other in a target area on the object to uniquely identify the device separated from and associated with the object;
   a camera configured to generate images of the target area, wherein the camera is sensitive to the frequency range of the invisible light emitted by the light source;
   a synchronization unit configured to synchronize the light source and the camera so that a first image of the target area is generated when the light source is inactive, and a second image of the target area is generated when at least during part of an exposure time for generating the second image, invisible light is emitted by the light source in the direction of pointing;
   a processor configured to process the images of the target area to determine a presence of the one or more retro-reflective marker elements on an object, the retro-reflective marker elements reflect at least part of the invisible light emitted by the light source back to the pointing device associated with the device to be controlled; and
   a controller configured to extract image data from at least one of the processed target area images, identify the device to be controlled and determine a control signal for the identified device using information pertaining to the retro-reflective marker elements, the extracted image data is extracted by means of a filter rule which is defined according to the device to be controlled.

\* \* \* \* \*